United States Patent [19]
Crum et al.

[11] 3,818,930
[45] June 25, 1974

[54] CONTROL SYSTEM FOR AN ADHESIVE GUN

[75] Inventors: Gerald W. Crum, Elyria; Allan B. Reighard, Bay Village; Simon Z. Tamny, Lorain, all of Ohio

[73] Assignee: Nordson Corporation, Amherst, Ohio

[22] Filed: Apr. 20, 1973

[21] Appl. No.: 352,962

[52] U.S. Cl. ......... 137/341, 222/146 HE, 251/61.2, 251/282, 251/335 B
[51] Int. Cl. ............................................. F16k 49/00
[58] Field of Search ............ 137/341; 251/61, 61.2, 251/282, 335 B; 222/146 HE

[56] References Cited
UNITED STATES PATENTS
3,587,930  6/1971  Newton et al. ............... 222/146 HE Primary Examiner—Henry T. Klinksiek
Attorney, Agent, or Firm—Wood, Herron & Evans

[57] ABSTRACT

The adhesive gun is electrically heated to translate feedstock from a solid state to a molten state, is pneumatically cooled to control the solid/melt feedstock interface within the gun's barrel, and is pneumatically powered to discharge the molten feedstock in response to operation of a trigger mechanism. The control system includes a novel regulator valve, the valve functioning to regulate high pressure inlet air to a maximum, predetermined pressure so that the pneumatic motor is not over powered and a novel pressure switch, the pressure switch functioning as an open/close switch for the heater's electric circuit so that the electric heater cannot function unless the high pressure inlet air is on. A thermostat for the electric heater is also provided in the electric circuit. The regulator valve, pressure switch and the thermostat of the control circuit are all incorporated or located within the adhesive gun's housing.

38 Claims, 9 Drawing Figures

CONTROL SYSTEM FOR AN ADHESIVE GUN

This invention relates to a thermoplastic material dispensing device adapted to translate a solid feedstock into a molten feedstock, and adapted to discharge that molten feedstock when desired by an operator. More particularly, this invention relates to a control system for such a dispensing device that is particularly adapted for use with hot melt adhesives.

A number of hand gun type dispensing devices are known to the prior art for applying a hot melt adhesive to a workpiece. Each such hand gun device is in the nature of an extruder in the sense that it translates solid feedstock into melt form, and then discharges that molten feedstock onto the workpiece as desired by an operator. Such a dispensing device is generally referred to as a gun because of its overall similarity in configuration and operation to a hand gun. That is, each such hand gun type dispensing device is generally provided with a piston grip or handle portion, a generally barrel-shaped portion within which the feedstock is melted, and a trigger mechanism by means of which feedstock discharge from the barrel is controlled. More specifically, a typical hand gun type dispenser for hot melt adhesive includes a barrel, and a heater block located at the barrel's fore end. A ram located at the barrel's aft end forces solid feedstock through the barrel into proximity with the heater block where it is turned molten at a solid/melt interface. The molten adhesive is then directed from the heater mechanism to a discharge valve/nozzle, discharge of the molten adhesive being controlled by the gun's trigger mechanism.

An unique and useful hand gun type dispensing device having the general functional characteristics described above but without the novel control characteristics of this invention is disclosed in U.S. application Ser. No. 307,020 entitled ADHESIVE GUN, filed Nov. 16, 1972, invented by G. W. Crum, E. T. Nord, A. B. Reighard, and S. Z. Tamny, and assigned to the assignee of this application.

From an operational standpoint, and since the gun is pneumatically powered, the gun's pneumatic motor must depend on plant or shop air available in its operational location as the power source for the pneumatic motor. In the United States, the nominal pressure of plant or shop air typically available in factory-type locations is about 100–125 psi. However, in other countries of the world, for example, certain countries of Europe, the nominal pressure of plant or shop air might be as low as about 50 psi. Further complicating the situation is the fact that the actual inlet air pressure available to the gun might well depend on its take-off location in the shop air distribution system. For example, if the gun's take-off location is at the end of the system, and depending on the number of other air powered machines or devices operating off that system simultaneously, the actual inlet air pressure available to the gun might be as low as one-half the nominal air pressure provided to the system. To overcome the wide potential variations in inlet air pressure at the location where the gun will be used, the gun's pneumatic motor is designed to operate and function properly at the lowest inlet air pressure which reasonably could be expected to exist. Therefore, in almost all operational locations the actual inlet air pressure is substantially higher than that air pressure level at which the gun is designed to operate. If the gun is supplied with air at these elevated air pressure levels, at least one undesirable effect may be observed. The resulting high hydraulic pressure in the molten feedstock may cause the flow of molten feedstock from the nozzle to be excessively rapid when the gun's trigger mechanism is activated causing difficulty for the operator in accurately controlling the quantity dispensed. Thus, it is desirable to provide a pressure regulator valve for the gun which controls the pressure of the inlet air to the gun's pneumatic motor to a desirable maximum level based on that air pressure level at which the gun is designed to operate. It is desirable that the gun be useful with many different hot melt adhesive type feedstocks as this is the type feedstock for which the gun is primarily designed. Hot melt feedstocks, however, are manufactured with a wide range of mechanical and physical properties ranging from hard and rigid to quite soft and plastic. It is generally desirable to use the upper end of design air pressure range with the harder adhesives to maximize flow rates and hydraulic pressures within the gun. With the softer and more readily deformed adhesives, however, the pressure may be lowered to reduce the tendency of the feedstock to expand radially and wedge within the gun's barrel in the manner of an expanding plug. Thus, it is desirable to provide an adjustment for the pneumatic pressure within the pneumatic motor of the gun so as to enable a wide hardness range of materials to be dispensed from the gun.

Further from an operational standpoint, and because heat is introduced into the gun's heater block structure through electrical resistance elements in combination therewith and because the gun's barrel is air cooled by means of an annular cooling chamber surrounding the barrel to establish the solid/melt interface within the barrel, it is desirable that the resistance heaters not be activated until the pressurized inlet air is introduced to the gun. A hot heater block structure, without pressurized inlet air being supplied to the gun, could well result in excessive barrel temperature and feedstock melt back, thereby causing jamming of the ram within the barrel. Thus, it is desirable to provide a pressure switch for the gun which functions as an open/close switch for the resistance heaters' electric circuit so that those heaters cannot function unless the high pressure inlet air is on.

Accordingly, it has been one objective of this invention to provide a control system for a thermoplastic material dispensing device that incorporates a novel pressure regulator valve with the device's housing in combination with the device's pneumatic motor. By incorporating the novel regulator valve with the device's housing (as opposed to requiring the customer to use a regulator valve separate and apart from the device), use of a correctly designed regulator valve for limiting the maximum pressure level of inlet air supplied to the device's pneumatic motor is insured, thereby insuring operability of the device according to its design performance characteristics. If the customer is left to supply his own regulator valve, the valve may not be used for reasons of false economy or, if used, might be set too high; both possibilities would, of course, adversely affect the device's actual performance characteristics.

In accomplishing this first objective, the novel regulator valve of this invention is seated in a pocket fixed to the gun's housing. The valve itself includes a poppet that is continuously spring loaded open, i.e., off its valve seat, toward an abutment, thereby continuously opening the pneumatic motor to inlet air when the shop air source is on (if at least partial exhaust of the inlet air from the gun is allowed) as well as when the shop air source is off. The poppet is seated against a valve body when the air pressure in the gun's pneumatic motor reaches the maximum predetermined level set by the spring, thereby closing the pneumatic motor to inlet air when the shop air source is on if exhaust of inlet air from the gun is prevented. When the air pressure decreases below that maximum predetermined level, the regulator poppet opens slightly to admit additional air supply to the distributor bore. In normal practice, the regulator poppet is continuously cracked off its valve seat to some extent (but is not fully open) during operation of the gun, the poppet tending to oscillate within a limited range during use of the gun. The valve's spring is adjustable by an exteriorly accessible screw so as to provide a suitable pressure range over which the valve is operable.

It has been another objective of this invention to provide a control system for a thermoplastic material dispensing device that incorporates a novel pressure switch with the device's housing in combination with the device itself. The pressure switch is interconnected with the electrical circuit for the heater block's resistance heaters, that circuit not being completed during use of the device until the pressure switch has been closed in response to the presence of pressurized inlet air within the device. In this manner, no heat is generated in the device's heater block until the pressure switch is activated by supplying pressurized inlet air to the device. Thus, the valve in the shop air distribution system that functions as the on/off valve for pressurized inlet air to the device may also function as the on/off switch for the device's resistance heaters. In other words, the heater block cannot be heated unless that inlet air on/off valve is open. This is desirable from the standpoint that a failure in the shop air system, i.e., in the pressurized inlet air source, automatically turns the resistance heaters off. Further, this is desirable from the standpoint that the on/off attitude of the gun is controlled at a single location (as opposed to a switch location for the resistance heaters and a valve location for the inlet air supply). Thus, pressurized inlet air must be provided to the device, i.e., the shop air must be on, before the device's electric circuit (which includes the heater block's resistance heaters to translate the solid feedstock into molten feedstock) can be completed.

In accomplishing this third objective, the novel pressure switch of this invention includes a sub-miniature switch fixed inside the gun's housing. A switch poppet is located in the air distribution system inside the gun, the poppet extending into proximity with the switch. When pressurized inlet air is introduced into the gun's air distribution system, the switch poppet is forced into contact with the pressure switch to close the resistance heaters' electric circuit, thereby causing the gun's heater block to be heated. When the shop air is off, the spring loaded pressure switch opens to break the resistance heaters' circuit.

Other objectives and advantages of this invention will be more apparent from the following detailed description taken in conjunction with the drawings in which:

FIG. 3 is a cross-sectional view similar to FIG. 2 showing the usual operational attitude of the regulator valve when the shop air is on;

FIG. 5 is a cross-sectional view taken along line 5—5 of FIG. 4 showing the novel pressure switch in the open attitude when the shop air is off;

FIG. 6 is a cross-sectional view similar to FIG. 5 showing the novel pressure switch in the closed attitude when the shop air is on;

GENERAL STRUCTURE AND OPERATION

The general structure of a hand gun type device adapted to dispense a thermoplastic material, e.g., a hot melt adhesive, in accord with the principles of this invention, is illustrated in the Figures. A complete and specific description of the hand gun's structure, and of its functional characteristics and operation, but without the control system of this invention, is found in U.S. Pat. application Ser. No. 307,020 entitled ADHESIVE GUN, invented by G. W. Crum, E. T. Nord, A. B. Reighard and S. Z. Tamny filed Nov. 16, 1972, and assigned to Nordson Corporation (the assignee of this application). The specific description of U.S. Pat. application Ser. No. 307,020 is incorporated herein by reference.

Figure 1:
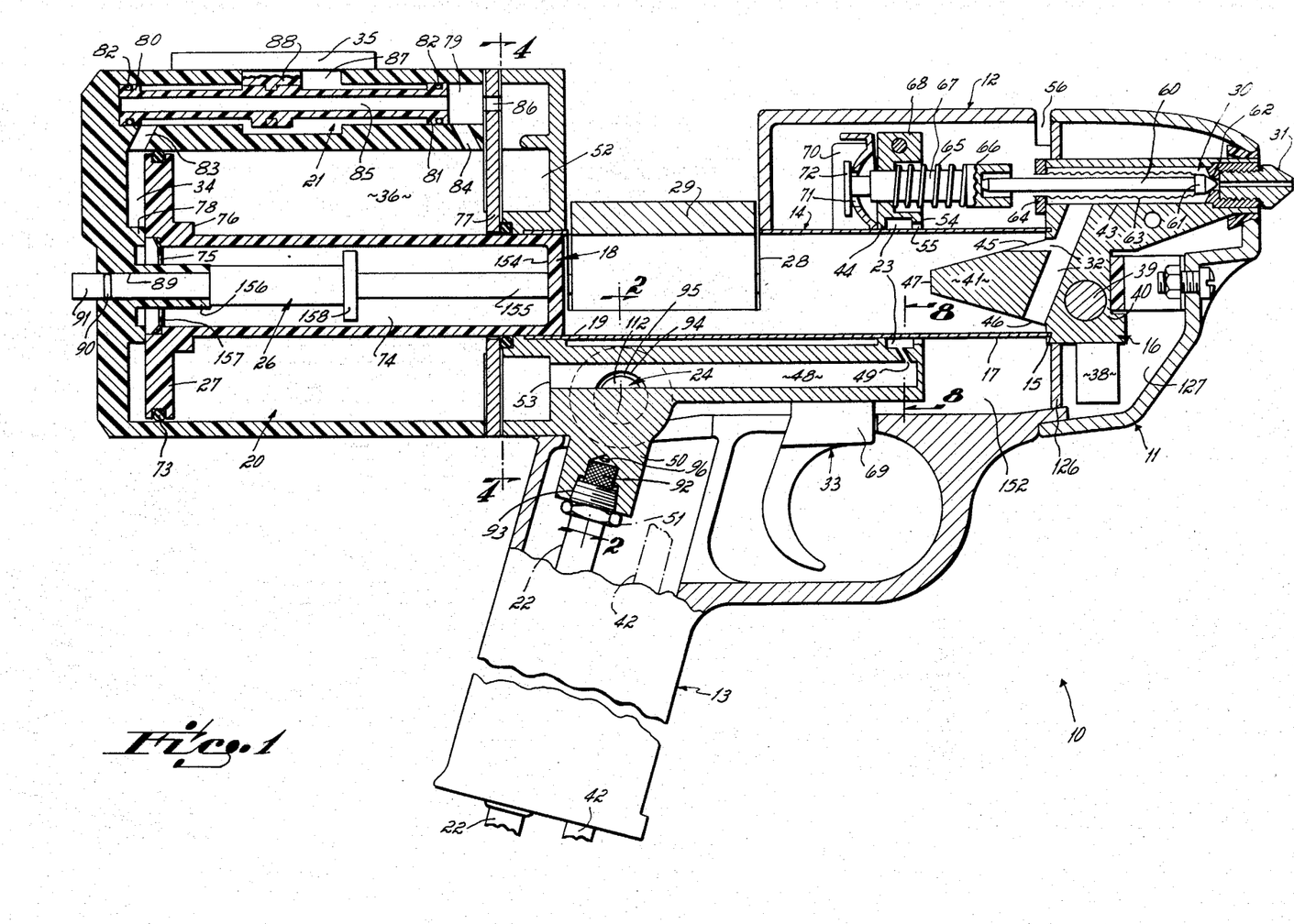
FIG. 1 is a side cross-sectional view taken axially of a hand gun adapted to extrude a thermoplastic material, e.g., a hot melt adhesive, that incorporates a control system structured in accord with the principles of this invention.

As shown in FIG. 1, the hand gun 10 includes a housing 11 having a generally barrel-shaped portion 12, and a piston grip type handle 13 depending from the underneath side thereof. A cylindrical barrel 14 is located inside the gun's housing 11, the barrel's axis being substantially parallel to the axis of the housing's barrel portion 12. The barrel 14 is seated, as at 15, in the heater block 16 at the fore end 17, and receives the axially movable ram 18 at the aft end 19. The ram 18 is driven fore and aft, i.e., is extended and retracted in a positive manner, by a pneumatic motor 20 that is controlled through use of a control or spool valve 21, the pneumatic motor being supplied with pressurized inlet air through inlet air line 22. An annular cooling chamber 23 is established about the gun's barrel 14 to maintain a solid/melt interface inside the barrel adjacent the heater block 16 structure, that zone being air cooled by pressurized inlet air also taken from inlet air line 22. A novel regulator valve 24, which is part of the control system of this invention, is fixed to the gun's housing 11 and cooperates with the gun's interior air distribution system for regulating the pressure of the inlet air supplied to the pneumatic motor 20 and the cooling chamber 23. A novel pressure switch 25, which is also part of the control system of this invention, is also fixed to the gun's housing 11 and cooperates with the gun's interior air distribution system for opening and closing the electrical circuit which causes the heater block 16 to be heated.

A thermostat 38 is a further part of the control system of this invention, the thermostat being fixed to the heater block 16 and interconnected in the heater block's electric circuit, thereby providing a failsafe feature to the gun.

A telltale rod 26, cooperatively interconnected with the ram 18 through the motor's piston head 27, indicates when recharging of the barrel 14 with additional feedstock is permitted. The barrel 14 is charged with feedstock (e.g., with a slug, not shown) through charging port 28 located topside of the barrel just forward of the ram 18 when the ram is fully retracted as shown in FIG. 1. A safety cover 29 is mounted to cooperate with the charging port 28.

A discharge valve 30 is located at the fore end 17 of the barrel 14, the discharge valve controlling discharge of molten feedstock through nozzle 31. Molten feedstock is transferred under hydraulic pressure from the barrel 14 to the discharge valve 30 through bores 32 in the heater block 16. The discharge valve 30 is actuable by an operator through use of a trigger 33 assembly.

In use, the barrel 14 is first charged with feedstock while the ram 18 is fully retracted, see FIG. 1. Such charging can be accomplished only when ram 18 is fully retracted because of safety lid 29 structure (not shown in detail) associated with the barrel's charging port 28. Pressurized inlet air is then introduced from inlet air line 22 through novel regulator valve 24 (which, if the inlet air pressure exceeds a predetermined set level, causes the air pressure to drop to that level) into the gun's air distribution system interiorly of the housing 11, the regulated, pressurized air thereby being distributed to annular cooling chamber 23 and pneumatic motor 20. The on/off control for the inlet air may be, e.g., an on/off valve (not shown) in a shop air distribution system that supplies the gun's inlet air line with high pressure air. Once the regulated, pressurized air reaches the pneumatic motor 20, novel pressure switch 25 is closed, thereby causing the heater block 16 to be heated.

Pressurized inlet air is introduced into the pneumatic motor's first chamber 34 by stroking handle 35 on spool valve 21 (and, hence, the spool valve itself) forward toward the gun's nozzle 31. Such forces the feedstock against the heater block 16 where it is melted, and forces the feedstock through bores 32 into discharge valve 30. When desired by the operator, discharge valve 30 is opened by pulling on trigger 33, thereby discharging the desired quantum of melt through nozzle 31. When recharging of the barrel 14 is desired, pressurized inlet air is transferred into the pneumatic motor's second chamber 36 by stroking handle 35 on spool valve 21 rearward toward the tail end of the gun's housing 11. Such returns the ram 18 to the charging position shown in FIG. 1 from its discharge position (not shown).

Specific Structure of the Gun

The gun's heater block 16 functions to translate the solid feedstock into molten feedstock. The heater block 16 includes a base 40 and a frusto cone 41 integral with the base. The base 40 of the heater block is provided with one or more electrical resistance type heater elements 39 fitted therewith. Temperature control means such as mechanical thermostat 38, or an electronic temperature control which senses the heater block 16 temperature and modulates the electric power to the resistance heating elements, is fixed to the heater block and is incorporated in the electric circuit 58 that includes the resistance heater 39. The resistance heater 39 and thermostat 38 are connected by suitable wiring 59 with electric power cord 42 in the gun's handle, the power cord being connected with an electric power source 91 at all times. The novel pressure switch 25 is a part of the electric circuit 58 that includes the resistance heater 39 and thermostat 38. The heater block's base 40 is also provided with a longitudinal valve bore 43 having an axis that is parallel with the axis of the gun's barrel 14. This valve bore 43 is connected by main transfer bore 32 with the barrel's interior, the transfer bore being of inverted Y-shaped configuration. Molten feedstock is fed from the barrel's interior through ports 45, 46 into the valve bore 43.

Figure 8:
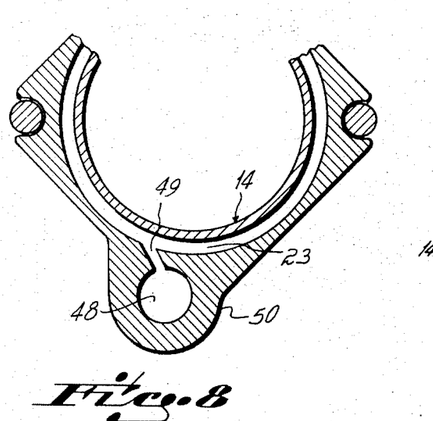
FIG. 8 is a cross-sectional view taken on line 8—8 of FIG. 1.
Figure 9:
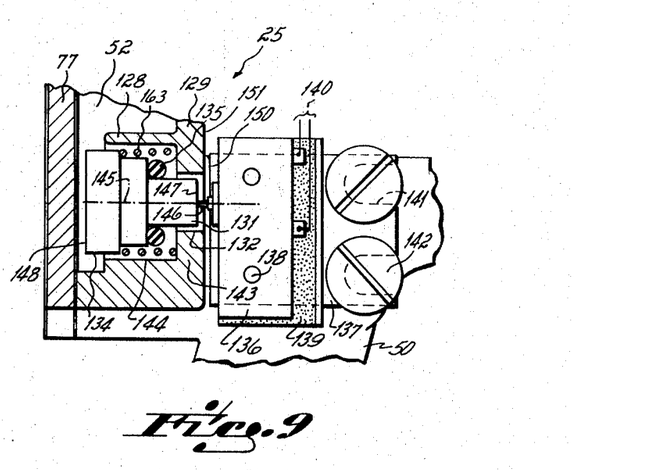
FIG. 9 illustrates an alternate embodiment of the novel pressure switch.

The gun's annular cooling chamber 23 is part of the gun's air distribution system, establishes the melt/solid interface of the feedstock, and prevents that interface from moving rearwardly toward the gun's charging port 28. The cooling chamber 23 is disposed coaxially with the barrel 14 on the outside thereof just aft of the frusto cone's face 47. A distribution bore 48, which is also part of the gun's interior air distribution system, runs axially of the housing underneath the barrel 14 and connects with the cooling chamber 23. The distribution bore 48 communicates with the cooling chamber 23 through a metering orifice or restrictor means 49 and with inlet air line 22, through novel regulator valve 24. Cooling of the barrel is effective primarily as a consequence of adiabatic expansion of the pressurized air stream as it is ejected from the orifice or restrictor 49. As may best be seen in FIG. 8, the orifice 49 is directed rearwardly and introduced into the chamber 23 tangentially so as to create a generally vortex air flow pattern within the chamber 23 and to prevent line of sight jet flow from the orifice 49, and particularly if noise is a problem, a porous plug or restrictor may be substituted for the orifice 49. The inlet air line 22 extends through handle 13, and is attached to frame 50 and retained in operative combination therewith by fitting 51. The distribution bore 48, at that end opposite the cooling chamber 23, opens onto an annular manifold chamber 52 (partially defined by frame 50) through port 53 that feeds the pneumatic motor 20.

Note that the barrel 14 is partially supported by annular rib 44 which defines the aft face of the cooling chamber 23. Note also that the annular rib 54 which defines the fore face of the cooling chamber 23 is slightly spaced from the outer periphery of the barrel 14, thereby providing an annular port 55 which directs the cooling air axially forward along the exterior surface of the barrel to aid in the cooling of the barrel and in the establishment of a large axial thermal gradient in the barrel section 17 in the area adjacent to the heater block 16. A baffle 126 made of a semi-resilient, electrically nonconductive, thermally insulating material (such as asbestos) closes off the front end interior 127 of the gun's housing from intermediate interior 152 of the gun's housing 11 and directs the cooling air escaping from chamber 23 out of the escape port 56. The baffle 126 further serves to prevent the escaping cooling air from contacting the thermostat 38 and effecting its set point and function, and to close off the exposed hot surfaces of the heater block 16 within front end interior 127 to loss of heat from the heater block 16.

Thus the cooling air from cooling chamber 23 escapes to atmosphere through escape port 56 in the gun's housing 11.

The discharge valve 30 includes a valve stem 60 and a valve head 61 within valve bore 43, the valve head being adapted to seat against a valve seat 62 in sealing fashion. A seal 63 in the nature of a compressible bellows is fixed at one end to the valve stem 60 adjacent the valve head 61, and is fixed at the other end to the inner periphery of a clearance hole in retainer plate 64 fixed to the heater block's base. The bellows seal 63 functions to allow axial movement of the valve stem 60 (and, hence, the valve head 61) on and off the valve seat as permitted by the trigger 33 assembly, while maintaining a seal to prevent leakage of molten feedstock through the aft end of the valve bore 43. The assembly comprised of valve head 61 and seal 63 is hydraulically unbalanced such that the valve head 61 and stem 60 will move rearwardly due to the hydraulic pressure of the molten feedstock (as viewed in FIG. 1) due to the hydraulic pressure of the molten feedstock when the compression spring 65 loaded stop 66 is removed from abutment against the aft end of the valve's stem 60. This allows molten feedstock to be discharged through the nozzle 31.

The gun's trigger 33 is adapted to cooperate with the spring 65 loaded stop 66. The trigger 33 functions only to withdraw the stop 66 against the spring 65 bias, thereby allowing the discharge valve 30 to open due to hydraulic pressure only of the molten feedstock. The stop 66 is mounted on a shaft 67 which is slidingly received in bracket 68 that is part of fixed frame 50. The spring 65 bears against the stop 66 and the bracket 68 so as to continuously bias the discharge valve 30 toward the closed attitude where the valve head 61 is seated on the valve seat 62, see FIG. 1. The trigger 33 is mounted to the base of an oval yoke 69 that surrounds the barrel 14, and a thumb 70 extends up from the oval yoke into proximity with the reciprocable stop's bracket 68. The trigger's thumb 70 defines an elongated slot 71 through which the stop's shaft 67 passes, a plate 72 being fastened onto the shaft so that the trigger's thumb is captured on the shaft between the plate and the bracket. Hence, the trigger 33 itself simply hangs on, i.e., is not directly connected to, the shaft 67. When the trigger 33 is pulled rearwardly by an operator's index finger, the trigger's thumb 70 bears against bracket 68, thereby causing the stop 66 to be drawn rearwardly against the bias of the compression spring 65 so that the discharge valve 30 can open. When the operator releases the trigger 33, pressure spring 65 moves the stop 66 into abutting contact with the valve stem 60, thereby closing the discharge valve 30 since the spring overcomes the melt's hydraulic pressure.

The gun's pneumatic motor 20 includes the piston head 27 that is fixed to and molded integral with the ram 18. The piston head 27 is located within a motor chamber, that chamber being divided into sub-chambers 34, 36 by the piston head. O-ring 73 insures the integrity of the sub-chambers 34, 36 one from the other. The ram itself defines a hollow interior 74 that is continually open to sub-chamber 34 through port 75 in the piston head. When fully extended, the stop flange 76 on the ram 18 engages plate 77 (which forms front end of the motor chamber) to form a positive limit stop on the ram's forward motion. The aft end of the motor chamber is also provided with an annular rib 78 adapted to function as an aft stop for the piston head 27, i.e., for the ram 18, when it is in the fully retracted position shown in FIG. 1.

A control valve in the form of the spool valve 21 is provided for the pneumatic motor. The spool valve 21 is interposed in the gun's air distribution system between the manifold chamber 52 (defined by frame 50 and plate 77) and the motor chamber 34, 36 along the top of the gun housing's barrel portion. The spool valve's handle 35 is mounted on the spool valve through slot 87 in the spool valve's housing, that interconnection being accomplished by use of web 88. The spool valve 21 is adapted to slide axially within spool valve bore 79. The spool valve 21 includes ribs 80, 81 at each end thereof, the annular groove defined in each rib being provided with an O-ring 82 to maintain operating pressure and integrity between the manifold chamber 52, and between the two sub-chambers 34, 36 of the motor chamber. Port 83 interconnects one end of the spool valve bore 79 with sub-chamber 34 of the motor chamber and port 84 connects the opposite end of the spool valve bore 79 with sub-chamber 36 of the motor chamber. Transfer bore 85 extends axially of the spool valve 21 from one end thereof to the other. The transfer bore 85 serves to interconnect the manifold chamber 52 (through port 86 in the plate) with the sub-chamber 36 of the motor chamber through port 84 when the spool valve is oriented as shown in FIG. 1, thereby causing the ram 18 to be retracted into the charging attitude when pressurized inlet air is introduced into the gun's air distribution system. The manifold chamber 52 is exposed to sub-chamber 34 of the motor chamber through port 83 when the spool valve 21 is stroked to the right through use of handle 35 as shown in FIG. 1, thereby causing the ram 18 to be extended toward the heater block 16.

The telltale rod 26 is slidingly received within telltale bore 89 formed in the gun's housing 11, that bore being coaxial with the axis of the ram 18 and barrel 14. O-ring 90 is provided to prevent leakage of air from the motor's sub-chamber 34 to atmosphere though that bore 89. The telltale rod 26 also extends into the hollow interior 74 of the ram 18. The telltale rod is adapted to move between an outer position (shown in FIG. 1) where its tip 91 is visually exposed to an operator, and an inner position (not shown) where the tip is removed from the operator's vision. As mentioned, when the telltale rod's tip 91 is retracted into the housing, the operator knows it is time to recharge the barrel 14.

The embodiment of the hand gun 10 illustrated is adapted to be charged with one slug (not shown) of solid feedstock at a time. A single slug is simply loaded into the barrel when the charging port's cover 29 is in the open attitude (not shown). Note particularly that the charging port 28 must be sized to receive a slug having a generally cylindrical configuration with an outside diameter no greater than the inside diameter of the barrel 14. The cover may be provided with safety structure (not shown) which prevents the cover 29 from being opened (and, thereby, prevents the inside of the barrel 14 from being exposed) except when the ram is in the fully retracted attitude shown in FIG. 1.

Specific Structure of the Control System

The control system of this invention is provided, of course, for the gun's pneumatic motor 20 and heater block 16 structure. A schematic diagram illustrating the control system of this invention is particularly illustrated in FIG. 7. Most of the control system components are incorporated with the gun's main frame 50 (those components being illustrated within the centerline geometry schematically illustrating the main frame). Those components not fixed to the gun's main frame 50 are, of course, otherwise located within the gun's housing 12.

Figure 7:
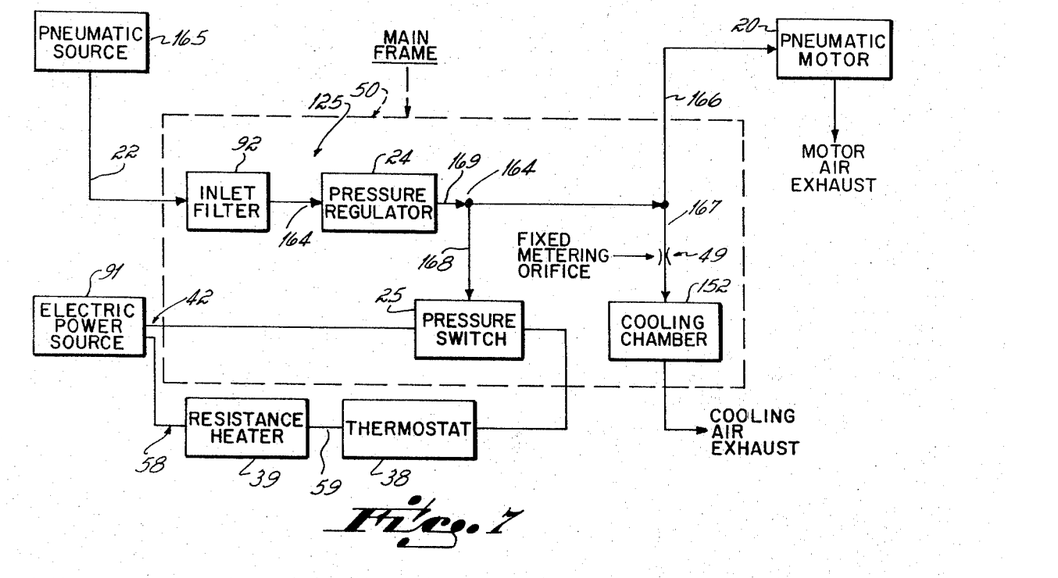
FIG. 7 is a schematic diagram of the electropneumatic control system in accord with the principles of this invention.

The control system is basically comprised of a pneumatic circuit 125 and an electric circuit 58. In FIG. 7 the pneumatic circuit 125 is schematically illustrated by lines having arrowheads 164 thereon, and the electric circuit 58 is schematically illustrated by lines without arrowheads. The pneumatic circuit 125 is, of course, connected with a suitable high pressure air or pneumatic source 165 remote from the gun. The electric circuit 58 is, of course, connected with a suitable electric power source remote from the gun.

In the pneumatic circuit 125, i.e., in the gun's interior air distribution system, inlet air is first passed through an inlet filter 92 prior to passing through the pressure regulator valve 24. The inlet air from the high pressure pneumatic source 165 passes through the pressure regulator valve 24 prior to being dispersed throughout the remainder of the pneumatic circuit within the gun's housing 12. After passing through the regulator valve 24, the inlet air is directed through line 166 to the pneumatic motor 20 for the ram 18. A limited quantity of air exhausts from the pneumatic motor 20 during operation thereof as will be explained in detail below. The inlet air from regulator valve 24 is also directed by line 167 through the metering orifice 49 into the annular cooling chamber 23 and, ultimately, exhausts to atmosphere through port 56 in the gun's housing 12. The metering orifice 49 is sized to provide optimum cooling effect at that location on the gun's barrel 14 as the inlet air passes into the cooling chamber 23. Inlet air is continuously passing through the annular cooling chamber 23, and being exhausted from the gun's housing 12 through port 56, when the inlet air line is open to the pneumatic or high pressure air source 165. A line 168 connects the main inlet air line 169 to a pressure switch incorporated in the gun's electric circuit 58. The electric circuit 58 also includes the electric resistance heater element 39 and a temperature control in the form of a thermostat 38. The electric circuit 58 is connected with a suitable electric power source 91.

The control system, as mentioned, includes the regulator valve 24, the pressure switch 25, and thermostat 38, all of which cooperate directly or indirectly with the air distribution system of the gun located interiorly of the gun, i.e., with the gun's pneumatic circuit. A filter screen 92 is interposed in the inlet air port 93 just prior to regulator valve 24, the filter screen being fabricated of wire cloth in a frusto-conical configuration. The filter screen 92, of course, insures that particular matter in the pressurized inlet air will be removed prior to contact of the air with the regulator valve 24 of pressure switch 25. This is desirable because plugging of the screen 92 will result in loss of pressurized inlet air to the gun's interior air distribution system, thereby causing the gun to be inoperative until the screen is cleaned, as will be explained in further detail below.

Figure 2:
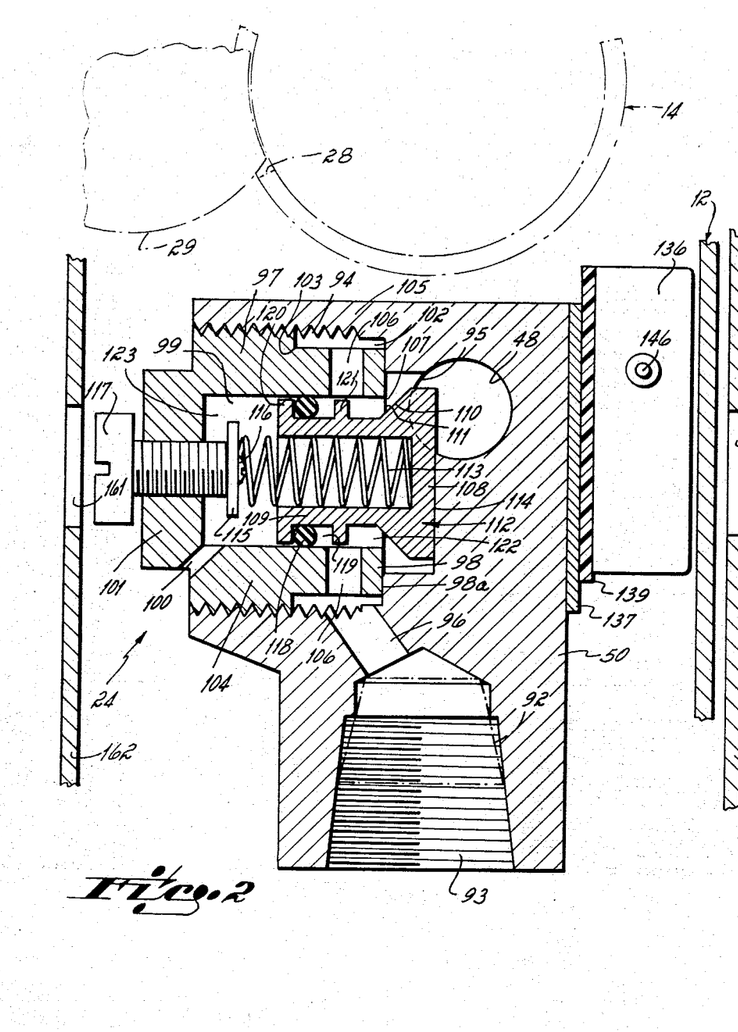
FIG. 2 is a cross-sectional view taken along line 2—2 of FIG. 1 illustrating the attitude of the novel regulator valve when the shop air is off.
Figure 3:
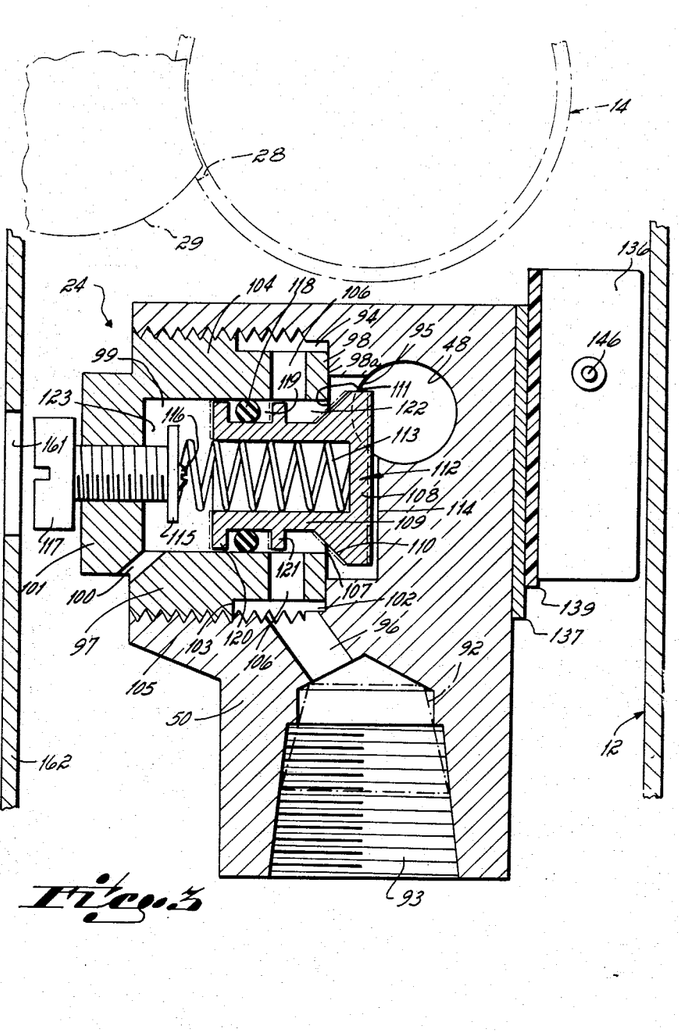
Figure 4:
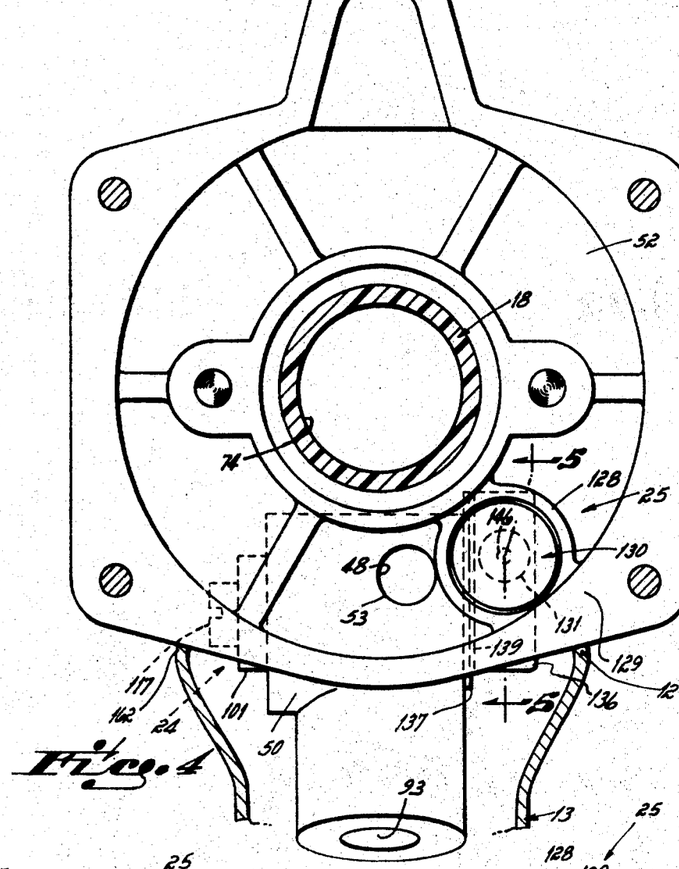
FIG. 4 is a cross-sectional view taken along line 4—4 of FIG. 1.

The regulator valve 24 is interposed in that part of the gun's interior air distribution system defined by the frame 50, i.e., between the distributor bore 48 and the threaded inlet port 93 where the inlet air line 22 is attached to the gun 10, see FIGS. 2 and 3. As illustrated in FIG. 2, the regulator valve 24 is threaded into a pocket 94 defined in the frame 50. The pocket 94 opens onto the distributor bore 48, as at 95, and communicates with threaded inlet port 93 through bore 96. The valve 24 includes a body or insert 97 that is of a cup-shaped configuration, the body 97 being threaded into the pocket 94 until rim 98 abuts annular flange 98a of the pocket to positively locate and seal the body (and, hence, the entire valve 24) within the pocket. Note that the cup-shaped body 97 opens toward the distributor bore 48 when it is seated in the pocket, the hollow interior 99 of the body being open to atmosphere only through bore 100 in the body's floor 101. Further, note that the body's interior 99 is opened to pressurized inlet air through bore 96 by means of an annular feed chamber 102 (defined by annular groove 103 formed in the body's side wall 104 and the pocket's wall 105), and diametrically opposed bores 106 (that connect the feed chamber 102 and body's interior 99) adjacent to the mouth 107 of the body 97.

A poppet 112 is slidingly received in the body's hollow interior 99 through mouth 107, the poppet including a head section 108 of substantially greater diameter than the diameter of the mouth that is connected with a neck section 109 of substantially lesser diameter than the mouth's diameter by means of a frustoconical section 110. When the frustoconical section 110 is seated on body edge 111 defined by the mouth 107, the body's interior 99 (and, hence, the inlet air port 93) is sealed off from the gun's interior pneumatic circuit or interior air distribution system (i.e., from the distributor bore 48).

The poppet 112 is compression spring 113 loaded against end wall 114 of the pocket 94, this end wall intersecting the distributor bore 48 to provide port 95. The compression spring 95 is received inside the hollow poppet 112 where it abuts against the poppet's head 108 at one end, and is abutted against a plate 115 fastened (as by deforming projection 116) to an adjusting screw 117 at the other end. The adjusting screw 117 is threadedly engaged with the valve's body 97, the screw's head being exposed to the gun's environment through access port 161 of the gun housing's side wall 162 for adjustment by an operator, thereby providing a means to vary the compression on the spring 113. This, of course, allows the maximum pressure level provided by the regulator valve 24 to be varied as desired within predetermined limits.

An O-ring 118 is provided in an annular groove 119 defined by ribs 120, 121 on the periphery of the poppet's neck section 109. Note that the width between ribs 120, 121 is substantially greater than the diameter of the O-ring 118, thereby allowing the O-ring to roll between the ribs as the poppet 112 moves axially within the body's interior 99. The O-ring 118 serves to maintain pressure integrity between the valve's open ended chamber 122 that connects the distributor bore 48 and inlet air line 22, and the valve's chamber 123. Chamber 123 is ported through bore 100 to atmosphere.

In use, and when the inlet air is off, i.e., when the shop air system's source 165 is not supplying pressurized air to the gun 10 through line 22, the regulator valve 24 assumes the attitude illustrated in FIG. 2. In this inlet air off attitude, the distributor bore 48 (and, hence, the pneumatic motor 20 and annular cooling chamber 23) is directly open to the air inlet line 22 because compression spring 113 seats the poppet 112 against the pocket's floor 114. The maximum pressure level of the regulator valve 24 is set by the spring 113 loading on the poppet 112 which is varied by the adjustment screw 117.

When the pressurized inlet air is first turned on (by use of an on/off valve, not shown, in the shop air system remote from the gun), and as the inlet air pressure in the distributor bore 48 (i.e., in the gun's interior pneumatic circuit) increases, this pressure acts on the effective diameter of the poppet 112 to move the poppet toward seated relation with the valve seat defined by the body's edge 111. In the inlet air pressure in the distributor bore 48 (i.e., in the gun's interior pneumatic circuit) exceeds the desired pressure level, the poppet 112 will approximate a seated relation with the valve seat defined by the body's edge 111, thereby sharply reducing inlet air flow from the inlet air port 93 to the distributor bore 48. This attitude would be momentary, however, since cooling air is continually escaping from bore 48 through annular cooling chamber 23 to the atmosphere, thereby reducing the pressure in bore 48 and allowing spring 113 to move poppet 112 away from edge 111.

Under normal operating conditions the poppet 112 will seek an equilibrium position about which it will oscillate over a small distance represented by the solid and phantom line positions of FIG. 3. Since there is a constant flow of cooling air exhausted through fixed metering orifice 49, and since this orifice is large compared to the potential leakage of regulator valve 24 when poppet 112 is seated on edge 111, the equilibrium position of poppet 112 will be some distance away from edge 111. Further, and since the amplitude of these oscillations are small compared to the diameter of the O-ring 118, and because the width of annular groove 119 is substantially greater than the diameter of the O-ring, the O-ring will roll rather than slide on its contact surfaces. This is desirable since rolling contact will result in significantly greater O-ring life than is afforded by sliding contact. During transient conditions such as found at start-up and shut-down, and when spool valve 21 is cycled, the axial motions of poppet 112 will be of sufficient amplitude to cause O-ring 118 to slide; this, however, will only occur during a small portion of the valve's total service life and will not materially affect O-ring life. Since the normal operating clearance between surface 110 and edge 111 is significantly larger than the normal machinery tolerances and surface finishes of such parts, the valve requires no special operations or seals for proper function as there is no requirement for tight shut-off. Therefore, this novel regulator valve is very rugged, simple and economical to fabricate, and quite insensitive to surface deposits or films, minor nicks and scratches, and mishandling. This novel regulator valve 24 also provides a minimum drop in outlet air pressure or flow versus inlet air pressure compared to regulator valve structures commonly used with plant air systems. Generally speaking, the outlet air pressure or flow of a regulator valve may decrease substantially, e.g., 10 percent or more, as the inlet air pressure is substantially increased from a base level; the regulator valve 24 of this invention normally results in a decrease of less than about 5 percent.

Figures 5, 6:
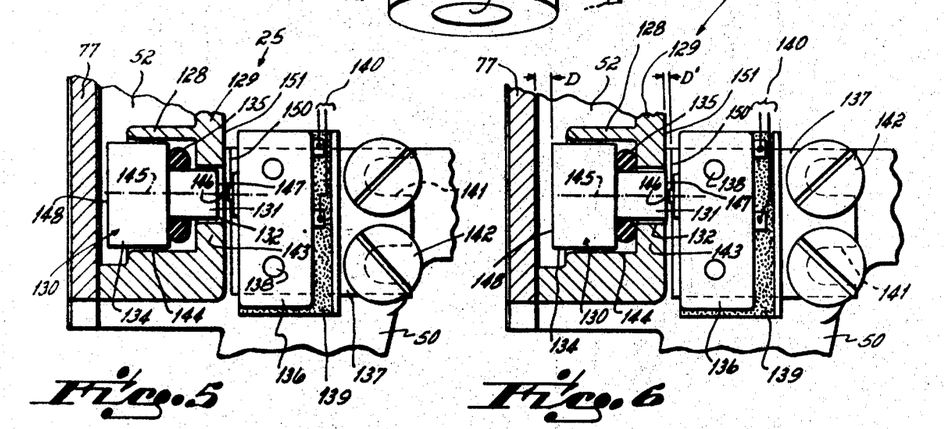

The control system, as mentioned, also includes the pressure switch 25, see FIGS. 5, 6 and 10. The pressure switch 25 is located downstream of the regulator valve 24 in the gun's interior air distribution system, and is located in cooperative relation with the manifold chamber 52 for the pneumatic motor 20. The pressure switch 25 includes an annular rib 128 formed interiorly of the manifold chamber 52 and integral with the chamber's housing 129. The annular rib 128 defines a bore within which poppet 130 is received. The poppet 130 is of a T-shaped configuration, the stem 131 of the poppet extending through a port 132 in the chamber's housing 129 and the head 134 of the poppet being located in the bore defined by annular rib 128. In an alternative embodiment shown in FIG. 10, spring 163 may be provided to load the poppet's head 134 (and, hence, the poppet 130) away from the port 132.

A switch 136 is fixed to the gun's housing 11 exteriorly of the manifold chamber 52, the poppet's stem 131 extending through the port 132 into cooperative relation with the pressure switch. The switch 136 is a sub-miniature, snap action type switch that is spring loaded open; this type of switch is readily available commercially. A sub-miniature switch has excellent repeatability, shock and vibration resistance, and requires relatively low forces for operation. The switch 136 is mounted onto a base plate 137 by rivets 138, the switch being separated from its base plate by a suitable insulation sheet 139. Leads 140 extend from the switch 136, and are interconnected in the electric circuit 58 which also includes the resistance heater element 39 and thermostat 38 for the heater block 16. The switch's mounting plate 137 (and, hence, the switch 136 itself) is fixed on the exterior of the gun's frame 50 but interiorly of the gun's housing 12 so that it is not accessible without dismantling the gun. The plate 137 is provided with open-ended notches 141 that cooperate with screws 142 in holding the plate to the frame. The open-ended notches 141 allow a degree of adjustability in positioning the switch 136 relative to the manifold chamber's housing wall 129 so as to properly position the switch relative to the stem face 147 of the pressure switch poppet for adequate operation during initial manufacture of the gun.

Note particularly that the fit of the poppet's head 134 within the seat defined by annular rib 128 is quite loose, and that the fit of the poppet's stem 131 within the bore 132 is also quite loose; this insures response of the poppet 130 relative to the switch 136 when pressurized inlet air is introduced into the manifold chamber 52 because of the minimal seating and unseating pressure forces required for operation of the poppet. Note also that the O-ring 135, being seated on the poppet's stem 131, provides a face-to-face seal with the floor 143 of the bore defined by the annular rib 128 (as opposed to a sliding seal with the inner side wall 144 of that bore), thereby contributing to minimizing the pressure forces necessary to operate the switch 36 while maintaining a seal for the manifold chamber's port 132. Note also that the poppet's axis 145 is coaxial with the switch's trip pin 146; therefore, pressure directly against the pin 146 from contact with the poppet stem's face 147 causes the switch 136 (and, hence, the electric circuit 58 for the heater block's resistance heater 39) to be activated. Note further that the distance D between the poppet head's face 148 and the adjacent plate 77 (when the O-ring seals the bore 132 as shown in FIG. 6) is substantially greater than the distance D' between the base plate's edge 150 and the outer surface 151 of manifold chamber 52; although the position of the switch's pin 146 relative to the bore 132 may be adjusted as necessary (to accommodate for tolerance characteristics of the switch 136), the switch's position cannot be adjusted to defeat the switch 136 function (i.e., cannot be adjusted so that the pin 146 is permanently activated by the poppet 130). Spring 163 in the alternative pressure switch embodiment shown in FIG. 10 insures that the switch 136 will not be activated until inlet air at an operable pressure level is present within the gun's interior air distribution system.

In use, and when no pressurized inlet air is being introduced into manifold chamber 52, switch 136 is spring (not shown) loaded open as no air pressure is acting on poppet's head 134. This, of course, breaks the electric circuit which includes the heater block's resistance heater 39 and thermostat 38 so that there is no heat provided for the heater block 16 even if the electric circuit is completed with the electric power source 91. Once pressurized inlet air is introduced into manifold chamber 52, then poppet 130 is driven toward switch 136. Poppet stem's face 147 contacts switch pin 146 and closes the switch 136, thereby closing the electric circuit that includes the resistance heater element 39 and thermostat 38 so that heater block 16 may be heated. Of course, when switch 136 is closed O-ring 135 seals the manifold chamber 52 off from atmosphere. This pressure switch 25 structure allows the gun's electric circuit 58 to be left connected to an electric power source 91 all the time since the circuit is not energized until the inlet air is on. Further, this pressure switch 25 allows the on/off valve, not shown, for the shop air distribution system that supplies the gun 10 to also control the heater block's electric circuit 58. Further, the heater block's electric circuit 58 is immediately and automatically broken if the shop air source fails. Further, if the filter screen 92 is plugged, the heater block's electric circuit is not activated even if the pressurized inlet air is present in inlet air line 22 since that pressurized air cannot pass the filter screen 92 to activate the pressure switch 25.

The thermostat 38 is provided in the control system's electric circuit 58 to sense the temperature of the heater block 16 and, if that temperature exceeds a predetermined level, functions to break or modulate the electric circuit so as to prevent overheating of the gun. The thermostat 38 is removed from contact with the cooling air that exhausts from cooling chamber 23 by means of baffle 126.

Specific Operation

In connection with the operation of the hand gun 10 illustrated, the barrel 14 is first filled with a charge of thermoplastic material, e.g., a hot melt adhesive. To charge a single slug into the barrel 14, the cover 29 is first opened to expose the barrel's interior through the charging port 28.

Actual operation of the gun 10, i.e., actual operation of the pneumatic motor 20 and the heater block 16, is controlled by the control system which includes the regulator valve 24 and the pressure switch 25. When use of the gun 10 is desired, pressurized inlet air is introduced to the gun through inlet air line 22. The inlet air is turned on by any suitable hand or other type on/-off valve, not shown, located in a shop air distribution system (not shown) that serves the location where the gun 10 will be used.

Once the pressurized inlet air is turned on, and assuming that the inlet air's pressure level is above the maximum pressure level set on the regulator valve 24, the pressurized air supply provided the pneumatic motor 20 and the cooling chamber 23 is regulated or held to that pressure level set by the regulator valve. This maximum pressure level may be varied as desired, within limits, by tightening or loosening the adjustment screw 117; this, of course, increases or decreases the compression on spring 113. When the pressure of the inlet air is substantially below the valve's preset level, the regulator poppet 112 is spring 113 loaded against wall 114 of the frame 50, thereby providing a continuous and direct flow of air between the inlet line 22 and the distribution bore 48. However, when the inlet air pressure exceeds the level set for the regulator valve, the regulator poppet tends to oscillate between minor limits as illustrated by the difference in the solid line and phantom line position shown in FIG. 3. Such occurs as the gun 10 is being used since metering port 59, cooling chamber 23 and exhaust ports 55 and 56 insure a constant flow of cooling air to atmosphere at all times. If, for some reason or another, the gun's housing 11 becomes completely airtight, air pressure in the distribution bore 48 will at least reach the maximum level set on the regulator valve 24, thereby forcing the regulator poppet 112 to seat against the annular edge 111 defined in the regulator body 97. This totally closes the distribution bore 48 off from the inlet air line 22 and, of course, insures that the air pressure within the gun itself never exceeds the maximum level set by the regulator valve 24.

Once pressurized inlet air is admitted into the inlet line (and, hence, directed into the distribution bore 48 of the gun 10 through the pressure regulator valve 24), this pressurized air is directed into the manifold chamber 52 for the pneumatic motor 20. The pressurized inlet air in the manifold chamber 52 translates the pressure switch poppet 130 from the FIG. 5 attitude to the FIG. 6 attitude, thereby activating or closing the switch 136 itself. Once the switch 136 is closed, the electric circuit 58 which includes the resistance heater 39 and thermostat 38 for the gun's heater block 16 is completed, thereby providing heat to the heater block. Of course, it is the pressure of the pressurized inlet air in the manifold chamber 52 acting on face 148 of the pressure switch poppet 130 which forces the poppet against the switch pin 146. A seal is established to maintain the integrity of the manifold chamber 52 once the switch 136 has been activated by virtue of O-ring 135 which is seated on wall 143 of the manifold chamber. Thus, the on/off switch for the gun's electric resistance heater circuit is the switch 136. When the inlet air to the hand gun is cut off, the spring loaded snap acting sub-miniature switch 136 pushes the pressure switch poppet 130 back to that attitude illustrated in FIG. 5, thereby once again breaking the electric circuit 58.

Motion of the ram 18 is controlled by spool valve 21 as manually positioned through use of handle 35. Transfer of the spool valve 21 into that attitude illustrated in FIG. 1 causes the ram 18 to be retracted as pressurized inlet air from manifold chamber 52 is directed through port 84 into subchamber 36 of the pneumatic motor 20. This forces the piston head 27 rearwardly with exhaust air in sub-chamber 34 being passed through port 83 into spool valve bore 79 and out through slot 87 to the atmosphere. When it is desired to extend the ram 18, the spool valve's handle 35 is stroked to its forwardmost position (not shown) so that pressurized inlet air from manifold chamber 52 is directed through transfer bore 85 and through port 83 into sub-chamber 34. This forces the piston head 27 forwardly with the exhaust air from sub-chamber 36 being passed to atmosphere through port 84, spool valve bore 79 and out through slot 87.

When the ram 18 is retracted, the inside face 154 of the ram contacts the fore end 155 of the telltale rod 26, thereby forcing the telltale rod aft until it stops against the collar 156 on the housing for the motor chamber 20, thereby visually exposing the telltale rod's tip 91 to an operator and locating the ram in a charging attitude. As the ram 18 is extended or moved forward, the pressurized air within the ram's hollow interior 74 acts on the telltale rod 26 to prevent it from moving forward toward the gun's nozzle 31 end until catch ring 157 actually engages the rod's flange 158. The catch ring 157 engages the telltale's flange 158 as the ram 18 reaches an intermediate extended position and, thereafter, pulls the telltale rod 26 inwardly with it as the ram continues to move forward. Once the tip 91 of the telltale rod 26 disappears into the gun housing's interior, same visually indicates to the operator that recharging of the barrel 14 is permissible.

The feedstock is melted as it is forced by the ram 18 into proximity with the heater block 16. The annular cooling chamber 23 (which is supplied with inlet air through distributor bore 48) provides a definite chill to the barrel's outer periphery which, in effect, establishes a solid/melt interface (not shown) that is retained inside the barrel 14 just aft of the heater block 16. The cooling air is exhausted from annular chamber 23 through annular port 55 and directed axially forward along the outside surface of the barrel and against the baffle 126, thereby also providing cooling for the gun's housing. This cooling air is exhausted to atmosphere through port 56 in the gun's housing 11.

After the feedstock has turned molten, it is forced into the discharge valve bore 43 through heater block bores 32 due to hydraulic pressure generated by ram 18. The molten feedstock is discharged through nozzle 31 when desired by an operator through operation of the trigger 33. As the trigger 33 is drawn rearwardly by the operator's index finger, stop 66 is drawn rearwardly against the forward push of spring 65. This frees the stop 66 from abutting engagement with the aft end of valve stem 60 and this, in turn, allows the hydraulic pressure on the seal 63 and the valve head 61 to lift the valve head off the valve seat. When valve head 61 lifts off its valve seat, molten feedstock discharges through the orifice in nozzle 31. As long as the rigger 33 is retracted by the operator's index finger, molten feedstock will issue from the nozzle 31 onto a workpiece as desired.

When it is desired to stop the flow of molten feedstock from the nozzle, the trigger 33 is simply released. This allows the spring 65 to push the stop 66 back into contact with the valve stem's aft end and this, of course, causes the valve head 61 to once again be seated on the valve seat. The flow of molten feedstock is thereby closed off.

While we have described in detail only one preferred embodiment of our invention, persons skilled in the art to which this invention pertains will readily appreciate numerous changes and modifications which may be made without departing from the spirit of our invention. As an example, the cooling air flow orifice 49 may be plugged with a porous plug while still retaining its cooling effect achieved by air flow through the restriction. Alternatively, the orifice may be made adjustable in size so as to vary or control the mass flow rate of cooling air through the restriction.

Therefore, what we desire to claim and protect by Letters Patent is:

1. A control system for a device of the type adapted to translate a solid feedstock to a molten feedstock through use of a fluid motor driven ram that forces said solid feedstock through a barrel into contact with a heater block that is heated with resistance heater elements, said control system comprising a pressure regulator valve operatively connected to the fluid distribution system interiorly of the device's housing, said pressure regulator valve serving to regulate the pressurized inlet fluid to said pneumatic motor to a predetermined level, and a pressure switch operatively connected to the device's interior fluid distribution system, said pressure switch serving to close an electric circuit to energize said resistance heater elements if said circuit is otherwise closed with respect to an electric power source, thereby allowing said circuit to close only when pressurized inlet fluid is present within the device's interior fluid distribution system.

2. A control system as set forth in claim 1 wherein said pressure regulator valve includes a valve body having an inlet port and an outlet port, said ports being connected through a hollow interior defined by said body, said body being seated in a pocket provided in the device's frame, a poppet slidably received within said hollow interior, said poppet having surface means exposed to the fluid distribution system interiorly of the device's housing, and said poppet being movable between a closed position where said inlet port is sealed off from said outlet port and an open position where fluid flow through said body may occur, and spring means cooperating with said poppet, said spring means continuously biasing said poppet toward the open position, thereby causing said valve to be full open in response to said spring means when no fluid flow occurs therethrough and allowing said poppet to be biased toward the full closed attitude in response to fluid pressure in the device's interior fluid distribution system acting on said poppet's surface means, said inlet port being sealed off from said outlet port when the fluid pressure in the device's interior fluid distribution system exceeds the predetermined pressure level.

3. A control system as set forth in claim 2 including adjustment means connected with said spring means, said adjustment means allowing said spring means to be adjusted as desired to change the setting of the predetermined pressure level of the valve.

4. A control system as set forth in claim 2 wherein said spring means is a compression spring, and wherein said adjustment means is accessible from the exterior of said device's housing.

5. A control system as set forth in claim 2 wherein said poppet includes a neck section and a body section, said neck section being slidably received within said hollow interior, said body section cooperating with said outlet port to close said valve if the fluid pressure level in the device's interior fluid distribution system exceeds the predetermined pressure level.

6. A control system as set forth in claim 4 including an O-ring seated on said poppet's neck section, said O-ring serving to separate said hollow interior into sub-chambers, one of said sub-chambers including said outlet port and the other of said sub-chambers being ported to atmosphere.

7. A control system as set forth in claim 6 including a seat for said O-ring integral with said poppet's neck section, said seat being of a width substantially greater than the diameter of said O-ring, thereby allowing said O-ring to roll within said seat during limited oscillatory motion of said poppet in response to fluid pressure variations in the device's interior fluid distribution system.

8. A control system as set forth in claim 6 wherein said spring means is a compression spring that is located in that sub-chamber ported to atmosphere.

9. A control system as set forth in claim 1 wherein said pressure switch includes a housing that defines a fluid chamber which is part of the device's interior fluid distribution system, said housing being provided with a port therethrough, a switch located exteriorly of said chamber and in general proximity to said port said switch being fixed to the device's housing, and a poppet located within said chamber and extending through said port, said poppet being urged into contact with said switch to either open or close said switch in response to fluid pressure within said chamber.

10. A control system as set forth in claim 9 wherein said switch is of the snap action type, said switch being normally open.

11. A control system as set forth in claim 9 including spring means associated with said poppet, said spring means biasing said poppet against the fluid pressure within said chamber.

12. A control system as set forth in claim 9 wherein said poppet is of a generally T-shaped configuration, the poppet's stem extending through said port and the poppet's head being restrained within said chamber's housing when pressurized fluid is present in said housing, and the poppet's stem serving to contact said switch.

13. A control system as set forth in claim 12 including an O-ring seated on the poppet's stem adjacent the underside of the poppet's head, said O-ring serving to seal said chamber to atmosphere through said port when substantial fluid pressure is present in said chamber.

14. A control system as set forth in claim 13 including a seat defined in the interior of said chamber housing, said seat and port structure cooperating to guide said poppet in axial movement in response to fluid pressure within said housing.

15. A control system as set forth in claim 10 wherein said switch is adjustably mounted relative to said chamber's port, said mounting allowing said switch to be moved relative to said port to compensate for the specific snap action characteristics of said switch.

16. A control system for a device of the type adapted to translate a solid feedstock to a molten feedstock through use of a fluid motor driven ram that forces said solid feedstock through a barrel into contact with a heater block, and said device having housing structure that encloses its main functional components, said system comprising an inlet fluid line connected with said device, said inlet fluid line providing pressurized inlet fluid for said fluid motor, and a pressure regulator valve connected to the device's fluid distribution system for regulating the fluid pressure in that fluid distribution system to a predetermined pressure level, said pressure regulator valve being located interiorly of the device's housing structure.

17. A control system as set forth in claim 16 including means for adjusting said pressure regulator valve, said means being accessible from exteriorly of the device's housing structure.

18. A control system as set forth in claim 16 wherein said pressure regulator valve includes a valve body having an inlet port, said ports being connected through a hollow interior defined by said body, said body being seated in a pocket provided in the device's frame, a poppet slidably received within said hollow interior, said poppet having surface means exposed to the fluid distribution system interiorly of the device's housing structure, and said poppet being movable between a closed position where said inlet port is sealed off from said outlet port and an open position where fluid flow through said body may occur, and spring means cooperating with said poppet, said spring means continuously biasing said poppet toward the open position, thereby causing said valve to be full open in response to said spring means when no fluid flow occurs therethrough and allowing said poppet to be biased toward the closed attitude in response to fluid pressure in the device's interior fluid distribution system acting on said poppet's surface means, said inlet port being at least partially sealed off from said outlet port when the fluid pressure in the device's interior fluid distribution system exceeds the predetermined pressure level.

19. A control system valve as set forth in claim 18 including adjustment means connected with said spring means, said adjustment means allowing said spring means to be adjusted as desired to change the setting of the predetermined pressure level of the valve.

20. A control system as set forth in claim 18 wherein said spring means is a compression spring.

21. A control system as set forth in claim 18 wherein said poppet includes a neck section and a body section, said neck section being slidably received within said hollow interior, said body section cooperating with said outlet port to partially close said valve if the fluid pressure level in the device's interior fluid distribution system exceeds the predetermined pressure level.

22. A control system as set forth in claim 20 including
an O-ring seated on said poppet's neck section, said O-ring serving to separate said hollow interior into sub-chambers, one of said sub-chambers including said outlet port and the other of said sub-chambers being ported to atmosphere.

23. A control system as set forth in claim 22 including
a seat for said O-ring integral with said poppet's neck section, said seat being of a width substantially greater than the diameter of said O-ring, thereby allowing said O-ring to roll within said seat during limited oscillatory motion of said poppet in response to fluid pressure variations in the device's interior fluid distribution system.

24. A control system as set forth in claim 22 wherein said spring means is a compression spring that is located in that sub-chamber ported to atmosphere.

25. A control system for a device of the type adapted to translate a solid feedstock to a molten feedstock through use of a motor driven ram that forces said solid feedstock through a barrel into contact with a heater block, and said device having housing structure that encloses its main functional components, said system comprising
an electric circuit that includes resistance heater elements, said elements being adapted to provide heat to the heater block,
at least one of a fluid motor and a cooling chamber that is supplied with pressurized inlet fluid through the device's fluid distribution system,
a switch fixed to said device adjacent a port provided in a chamber which defines a portion of said fluid distribution system located interiorly of the device's housing structure,
a poppet located within said chamber and extending through said port into operating proximity with said switch, said poppet being urged into contact with said switch to close said switch in response to fluid pressure within said chamber, thereby closing said circuit to energize said resistance heater elements only if pressurized fluid is supplied to said fluid distribution system.

26. A control system as set forth in claim 25 including
a thermostat in said electric circuit, said thermostat serving to open said circuit if the temperature of said heater block exceeds a predetermined level.

27. A control system as set forth in claim 25 wherein said pressure switch includes
a fluid chamber which is part of the device's interior fluid distribution system, said chamber being provided with a port therethrough,
a switch located exteriorly of said chamber and in general proximity to said port, said switch being fixed to the device's housing, and
a poppet located within said chamber and extending through said port, said poppet being urged into contact with said switch to either open or close said switch in response to fluid pressure within said chamber.

28. A control system as set forth in claim 27 wherein said switch is of the snap action type, said switch being normally open.

29. A control system as set forth in claim 27 including
spring means associated with said poppet, said spring means biasing said poppet against the fluid pressure within said chamber.

30. A control system as set forth in claim 27 wherein said poppet is of a generally T-shaped configuration, the poppet's stem extending through said port and the poppet's head being restrained within said chamber's housing when pressurized fluid is present in said housing, and the poppet's stem serving to contact said switch.

31. A pressure switch as set forth in claim 30 including
an O-ring seated on the poppet's stem adjacent the underside of the poppet's head, said O-ring serving to seal said chamber to atmosphere through said port when substantial fluid pressure is present in said chamber.

32. A control system as set forth in claim 31 including
a seat defined in the interior of said chamber housing, said seat and port structure cooperating to guide said poppet in axial movement in response to fluid pressure within said housing.

33. A control system as set forth in claim 28 wherein said switch is adjustably mounted relative to said chamber's port, said mounting allowing said switch to be moved relative to said port to compensate for the specific snap action characteristics of said switch.

34. An electro-pneumatic control system for a device of the type adapted to translate a solid feedstock to a molten feedstock through use of a pneumatic motor driven ram that forces said solid feedstock through a barrel into contact with a heater block that is heated with resistance heater elements, said device including a pneumatic circuit and an electrical circuit located interiorly of the device's housing structure, said system comprising
a pressure regulator valve adapted to limit the pressure within the pneumatic system to a predetermined level regardless of the pneumatic inlet pressure,
a pressure switch located in said electric circuit and interconnected with said pneumatic circuit, said pressure switch being activated in response to pneumatic pressure within said pneumatic circuit.

35. A control system as set forth in claim 34 including
restrictor means in said pneumatic circuit downstream of said pressure regulator valve, said restrictor means being adapted to regulate the flow of coolant gases for the device's barrel from said pneumatic circuit.

36. A control system as set forth in claim 35 including
a thermostat in said electric circuit and interconnected with the device's heater block, said thermostat providing a failsafe feature that prevents overheating of the device.

37. A control system as set forth in claim 36 wherein said thermostat and heater block are isolated from said cooling gases by baffle means.

38. A control system as set forth in claim 34 including a filter positioned in said pneumatic circuit upstream of said pressure regulator valve.

* * * * *